United States Patent
Liang et al.

(10) Patent No.: US 9,277,026 B2
(45) Date of Patent: Mar. 1, 2016

(54) CACHE STICKINESS INDEX FOR CONTENT DELIVERY NETWORKING SYSTEMS

(71) Applicant: Facebook, Inc., Menlo Park, CA (US)

(72) Inventors: Xiaojun Liang, San Jose, CA (US); Hongzhong Jia, Cupertino, CA (US); Jason Taylor, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 236 days.

(21) Appl. No.: 13/934,697

(22) Filed: Jul. 3, 2013

(65) Prior Publication Data

US 2015/0012710 A1    Jan. 8, 2015

(51) Int. Cl.
*G06F 12/00* (2006.01)
*H04L 29/08* (2006.01)

(52) U.S. Cl.
CPC ........ *H04L 67/2842* (2013.01); *H04L 67/1006* (2013.01); *H04L 67/306* (2013.01)

(58) Field of Classification Search
None
See application file for complete search history.

(56) References Cited

U.S. PATENT DOCUMENTS

| 8,204,878 | B2* | 6/2012 | Amer-Yahia et al. | 707/723 |
| 8,903,876 | B2* | 12/2014 | Michael | G06F 17/30221 707/824 |
| 2005/0204098 | A1* | 9/2005 | Martin et al. | 711/130 |
| 2007/0174660 | A1* | 7/2007 | Peddada | 714/4 |

* cited by examiner

*Primary Examiner* — Brian Peugh
(74) *Attorney, Agent, or Firm* — Perkins Coie LLP

(57) ABSTRACT

Various embodiments of the present disclosure relate to a cache stickiness index for providing measurable metrics associated with caches of a content delivery networking system. In one embodiment, a method for generating a cache stickiness index, including a cluster stickiness index and a region stickiness index, is disclosed. In embodiments, the cluster stickiness index is generated by comparing cache keys shared among a plurality of front-end clusters. In embodiments, the region stickiness index is generated by comparing cache keys shared among a plurality of data centers. In one embodiment, a system comprising means for generating a stickiness index is disclosed.

20 Claims, 8 Drawing Sheets

CACHE STICKINESS INDEX FOR CONTENT DELIVERY NETWORKING SYSTEMS

FIELD OF INVENTION

The present disclosure relates generally to caching, and more particularly to generating a cache stickiness index associated with a content delivery networking system.

BACKGROUND

Social networking systems typically use a caching system to support data requests from users. Caches store data recently retrieved from a system database. Subsequent user requests for the same data can then be routed to the caches for quick retrieval. This quick turnaround lightens the load on the system database and enhances user experience. For large social networking systems that use multiple data centers, each with multiple caches, to support data requests from millions (or even billions) of users, it is beneficial to have efficient traffic routing policies. Traffic routing policies control which data centers and/or which caches are accessed to support data requests submitted to a social networking system. Routing the data request to a particular data center and/or a particular cache in which the data is "hot" (i.e., same data has been recently stored in the particular location) can have many benefits. However, it is often difficult to design a measurable goal for tuning traffic routing policy.

SUMMARY

The present disclosure contemplates methods, systems, paradigms, and structures for generating cache stickiness index to provide measurable metrics associated with caches of content delivery networking systems. In one embodiment, a method is disclosed for generating a cache stickiness index, such as a cluster stickiness index, a region stickiness index, or both. In embodiments, a plurality of stickiness values is generated by comparing unique cache keys shared among a plurality of working sets. In one embodiment, a system comprising means for generating a stickiness index is disclosed.

Other aspects, elements, features, and steps in addition to, or in place of, what is described above will be apparent from the accompanying figures and detailed description.

BRIEF DESCRIPTION OF THE DRAWINGS

One or more embodiments of the present disclosure are illustrated by way of example and not limitation in the figures of the accompanying drawings, in which like references indicate similar elements. In the drawings.

Figure 1:
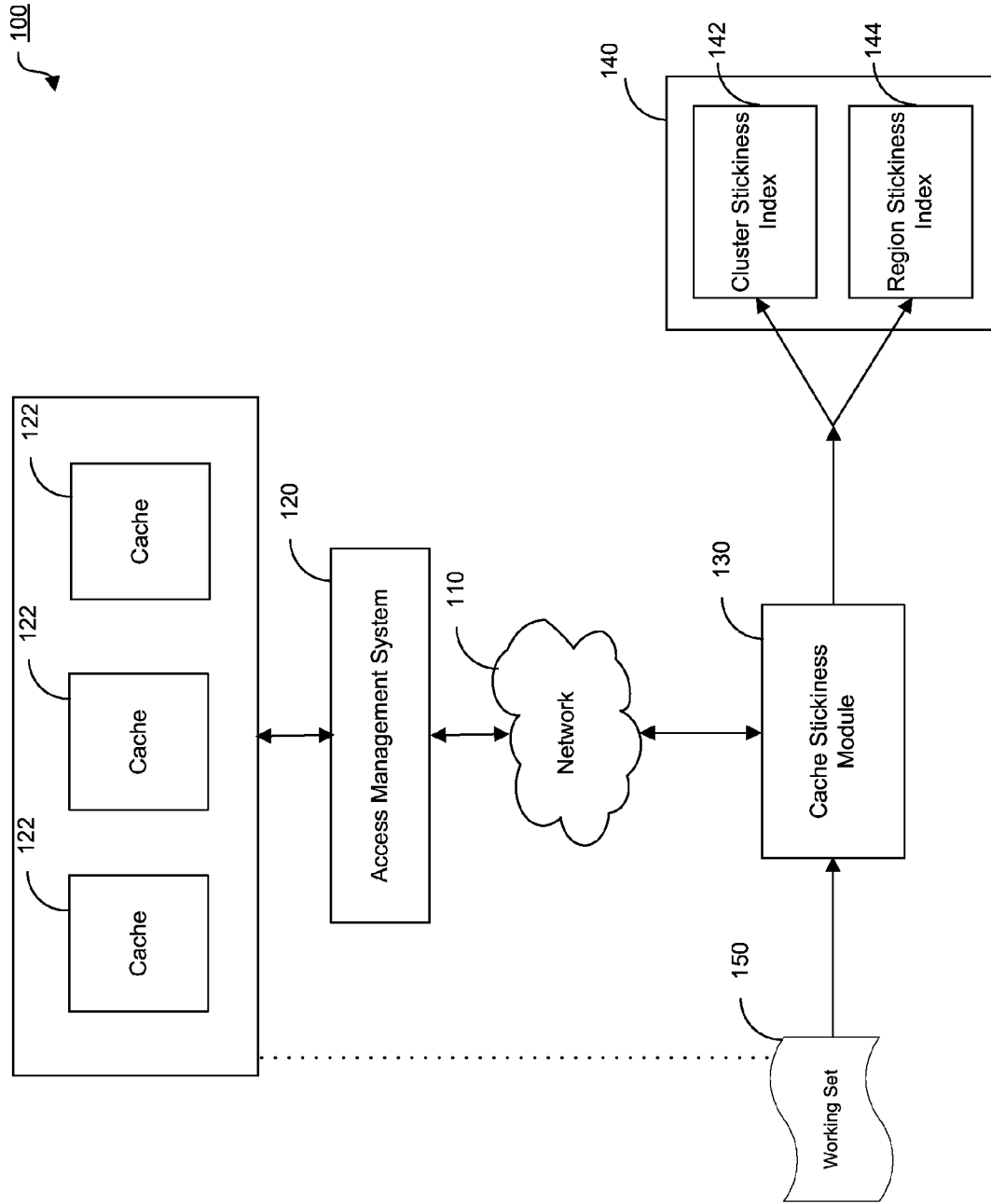
FIG. 1 is a diagram illustrating an example networking system in which one or more embodiments of the present disclosure may be implemented.

One skilled in the art will readily recognize from the following discussion that alternative embodiments of the structures and methods illustrated herein may be employed without departing from the principles of the disclosure described herein.

DETAILED DESCRIPTION

Disclosed are methods, systems, paradigms, and structures for generating a cache stickiness index to provide measurable metrics for optimizing service of user requests in content delivery networking systems. In any content delivery networking system, such as a social networking system, an access management system is generally used to manage service of user requests. The access management system may be a module of networking devices, computing mechanisms, storage, and application components that work together to deliver networking services.

The access management system is utilized by a content delivery networking system (or "networking system") to decide where a user request should be sent in order to fetch data items associated with the request. The user request may be, for example, a request for a photograph generated on a platform system associated with the networking system. In particular, the access management system follows a traffic routing policy to decide which cache host of the networking system is the appropriate receiver of the user request. Upon receiving the user request, a selected cache host gathers data (e.g., the photograph and related information) to service the request, and sends that data back to the access management system. For example, the cache host fetches the photograph from a cache of the networking system. Subsequently, the access management system transmits the data (including the photograph) to the user.

Typically, a user request is distributed, or transmitted, by the access management system across all cache hosts of the networking system based on load balancing. When load balancing, the access management system may send a subsequent request for the same data item to another cache, where the data item may not reside. As such, a cache miss may occur, and the data item may have to be fetched from the database, resulting in slow performance and reduced user experience.

The present disclosure contemplates a "stickiness" metric that provides a measureable outcome for guiding routing decisions of the access management system. For example, if a stickiness value is available for a cache X, where the value is indicative of how "sticky" a user request is to cache X, then routing that request directly to cache X, where the data is warm (i.e., recently accessed), will increase the likelihood of resulting in a cache hit. Using the stickiness value as a metric, a developer, for example, has a measurable goal on which to improve routing policies for sending user requests to various caches of the networking system.

In order to generate the stickiness metric, a technique of the present disclosure contemplates generating a cache stickiness index which contains a plurality of stickiness values associated with data storage systems, such as a "front-end cluster" or a "region." The plurality of stickiness values may be utilized for analyzing operations of the networking system. In some embodiments, the stickiness values may be organized into two types of stickiness metrics, a cluster stickiness metric and a region stickiness metric. In embodiments, the cache stickiness index comprises a cluster stickiness index, representative of the cluster stickiness metric, and a regional stickiness index, representative of the region stickiness metric. In particular, the cluster stickiness index includes stickiness values computed for a plurality of data items shared among one or more "front-end clusters" within a "region" of the networking system. The region stickiness index includes stickiness values computed for a plurality of data items shared among "regions" within a "global set" of the networking system. In embodiments, the plurality of data items are distinctly different from one another, as identified by cache keys of the plurality of data items.

Certain implementations of the present disclosure provide many benefits including, but are not limited to: (1) assisting the development of efficient traffic routing policies of the social networking system by providing measureable outcomes (i.e., metrics in the form of cache stickiness index values); (2) enabling the ability to monitor and measure disaster discovery and recovery by having the metrics to set measurable baselines; (3) optimizing data center utilization and cache access by having the metrics to assist in deduplication decisions; (3) reducing infrastructure cost by providing the metrics to evaluate resource utilization; and (4) enhancing user experience by providing the metrics to improve cache hit ratios.

Before discussing further details of the techniques of the present disclosure, it is useful to define certain terminology. The term "cluster stickiness index" refers to an index comprising stickiness values associated with how "sticky" is a particular front-end cluster. As will be discussed in further details below, a front-end cluster is "sticky" if it contains data items that are not duplicated, or shared, with other front-end clusters in the same region. The term "front-end cluster," as used herein, refers to a cluster of devices that temporarily stores information (or "data items") which is served to front-end user devices in response to the user requests. For example, a cache can be implemented by a front-end cluster. The term "region", "regional data center", or "data center", used interchangeably herein, refers to a plurality of networked front-end clusters within a locality. For example, a regional data center is associated with a continent (e.g., North America), where the plurality of front-end clusters of that regional data center are used to store data for servicing user requests in that location (e.g., content accessed by user devices in North America).

The term "region stickiness index" as used herein refers to an index comprising stickiness values associated with how "sticky" is a particular region. As will be discussed in further details below, a region is "sticky" if it contains data items that are not duplicated, or shared, with other regional data centers in the same global set. As used herein, the term "global set" generally refers to a set containing all regions associated with the networking system, where the regions within the global set are managed by the access management system. The networking system, for example, may have a global set including five regions, or data centers, for serving user requests distributed across five particular continents, with one region dedicated for serving each continent.

An analysis of a working set of (i) a front-end cluster or (ii) a region determines how "sticky" is the particular front-end cluster or the particular region. The term "working set" as used herein refers to a set of unique cached items within a front-end cluster or a region. A working set may be associated with a particular front-end cluster. For example, the working set associated with a "photo cluster" is a working set comprising unique cached items related to photos stored in the photo-only cache implemented by the photo cluster. A working set may also be associated with a particular region. For example, a working set of a North America region, or data center, comprises all unique cached items in a plurality of front-end clusters of that region utilized for serving user requests in North America. The unique cached items associated with the photo cluster in the example above may be included in the working set of the North America region.

Various aspects and examples of the present disclosure will now be described with reference to the accompanying drawings, where like reference numerals refer to like elements throughout. Indeed, the following description provides specific details for a thorough understanding and enabling description of the examples. One skilled in the art will understand, however, that the present disclosure may be practiced without many of these details. Additionally, some well-known structures or functions may not be shown or described in detail, so as to avoid unnecessarily obscuring the relevant description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

FIG. 1 depicts a block diagram of an example system environment 100 in which the techniques described herein may be implemented. Although not required, aspects of the present disclosure may be described below in the general context of computer-executable instructions, such as routines executed by a general-purpose data processing device (e.g., a server computer or a personal computer). Those skilled in the relevant art will appreciate that the invention may be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the present disclosure, such as certain functions, are described as being performed exclusively on a single device, the invention may also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, which have stored thereon instructions that may be used to program a computer (or other electronic devices) to perform a process. The tangible computer-readable media may include, but are not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media or machine-readable medium suitable for storing electronic instructions. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As illustrated in FIG. 1, the networking system 100 includes an access management system 120, a plurality of cache devices 122, and a cache stickiness module 130 in communication over a network 110. The plurality of cache devices 122 may be implemented by one or more "front-end clusters" or one or more "regional data centers" of a content delivery networking system for storing data to service user requests. In one example, a particular cache device 122 is utilized by a front-end cluster to store (and serve) user requests associated with photographs generated on a system platform of the networking system. In another example, one or more of the cache devices 120 are utilized by a regional data center to serve user requests in the North America.

The access management system 120 manages access to the plurality of cache devices 122 to service the user requests. The cache stickiness module 130 is in communication with the plurality of cache devices 122 for generating stickiness values associated with cached items stored in the plurality of cache devices 122. In some embodiments, the stickiness values may be utilized by the content delivery networking system (or "networking system") for guiding, for example, the access management system 120.

The cache stickiness module 130 generates the stickiness values by determining a working set 150 associated with the plurality of cache devices 122. In some embodiments, the working set 150 determined may contain a plurality of unique cached items belonging in one or more cache devices implemented by a front-end cluster (not shown) of the networking system. In other embodiments, the working set 150 determined may contain a plurality of unique cached items belonging in one or more cache devices implemented by a regional data center (not shown) of the networking system. As will be discussed in further detail below, the regional data center may include a plurality of front-end clusters implementing the one or more cache devices.

The cache stickiness module 130 may be any module of computing machinery which includes computer readable program instructions capable, when executed by a processor of a computer system, of causing the computer system to carry out the steps of generating the stickiness values. The cache stickiness module 130 may include a memory (not shown), such as RAM, disk drive, EEPROM drive, etc. Further, the cache stickiness module 130 may be coupled to one or more processors (not shown).

In some embodiments, the stickiness values generated by the cache stickiness module 130 may be stored in a cache stickiness index 140. In some embodiments, the cache stickiness index 140 may include a cluster stickiness index 142 and a region stickiness index 144 for storing different types of stickiness values. In some embodiments, the cache stickiness index 140 may include only stickiness values, without any categorization into different types of stickiness values. In some embodiments, the cluster stickiness index 142 and the region stickiness index 144 may exist as two separate entities. For example, the cluster stickiness index 142 is a cache stickiness index storing only stickiness values associated with a plurality of front-end clusters within a regional data center of the networking system. In another example, the region stickiness index 144 is a cache stickiness index storing only stickiness values associated with a plurality of regional data centers within a global set of the networking system.

The cache stickiness index 140, the cluster stickiness index 142, or the region stickiness index 144, individually, may be stored at a local database and/or a remote database. The cache stickiness index 140, the cluster stickiness index 142, or the region stickiness index 144, individually, stores stickiness values generated by the cache stickiness module 130. For example, the cluster stickiness index 142 stores a stickiness value for each front-end cluster within a region of the networking system. In another example, the region stickiness index 144 stores a stickiness value for each region within a global set of the networking system.

The network 110 is configured to interconnect various computing devices, such as the cache stickiness module 130 to the plurality of caches 120. The network 110 may include any number of wired and/or wireless networks, including the Internet, intranets, local area networks (LANs), metropolitan area networks (MANs), wide area networks (WANs), personal area networks (PANs), direct connections, and/or the likes. Additional computing devices, such as routers, network switches, hubs, modems, firewalls, gateways, Radio Network Controllers (RNCs), proxy servers, access points, base stations, and/or the likes may be employed to facilitate network communications. In addition, the various computing devices may be interconnected with TI connections, T3 connections, OC3 connections, frame relay connections, Asynchronous Transfer Mode (ATM) connections, microwave connections, Ethernet connections, token-ring connections, Digital Subscriber Line (DSL) connections, and/or the likes. Further, the network 110 may utilize any wireless standard and/or protocol, including, but not limited to, Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), and/or the likes.

Having a region stickiness index is advantageous for many reasons. In a networking system, user data are generally stored in cache of a data center according to access locality. This is so because, for example, friends of a user are mostly located in the same geographic location. As such, cache efficiency could be improved if the user and the friends are served from one geographical data center, in which the same data have already been cached. If multiple data centers are utilized to serve the user and the friends, multiple copies of the same data are created on the data centers as a result, causing significant increase in infrastructure cost. Having the region stickiness index, with stickiness values computed for a plurality of data centers of the social networking system, is beneficial to reduce the infrastructure cost. For example, the social networking system, by looking at the stickiness value of a particular data center, is able to recognize that particular data center to be the optimal place to route all data requests associated with North America.

Having a cluster stickiness index is also advantageous for many reasons. By monitoring and evaluating stickiness values for a plurality of front-end clusters within a region, or data center, the networking system is able to identify whether there exists multiple copies of a certain data (i.e., duplicate data) within the data center. Thus, having the stickiness values, a better decision can be made as whether or not to perform deduplication. Reduction of multiple copies of the same data created on multiple front-end clusters can improve cache efficiency of the data center. Further, in a scenario where the duplicate data is "hot" data (i.e., data so frequently accessed), where the number of requests is very big, the networking system is able to intelligently determine whether it should keep the duplicate data; service of data from multiple front-end clusters can help balance the work load and avoid stressing any particular cache host.

Working Sets

Figure 2:
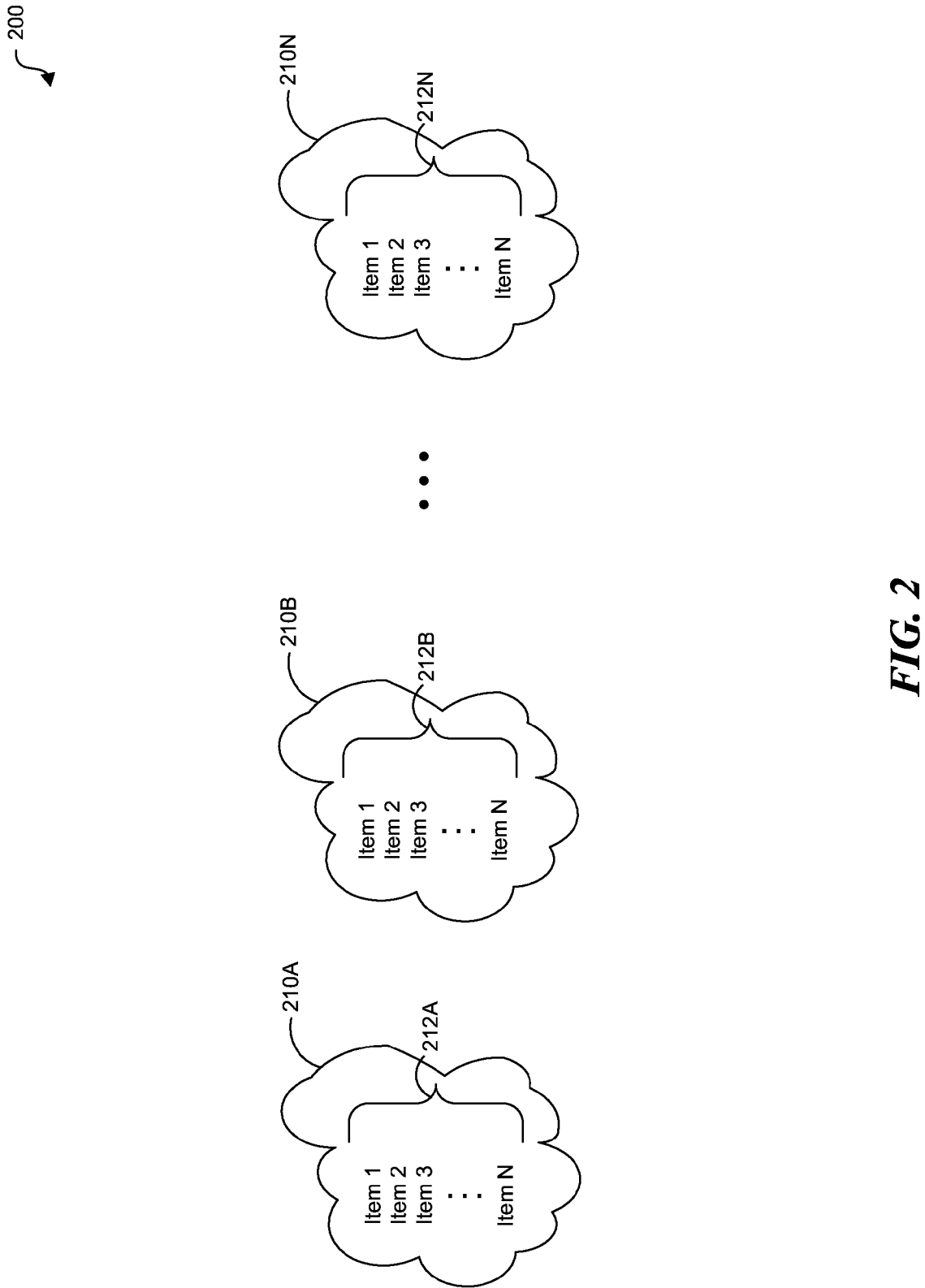
FIGS. 2-3 are block diagrams of example working sets in accordance with one or more embodiments of the present disclosure.
Figure 3:
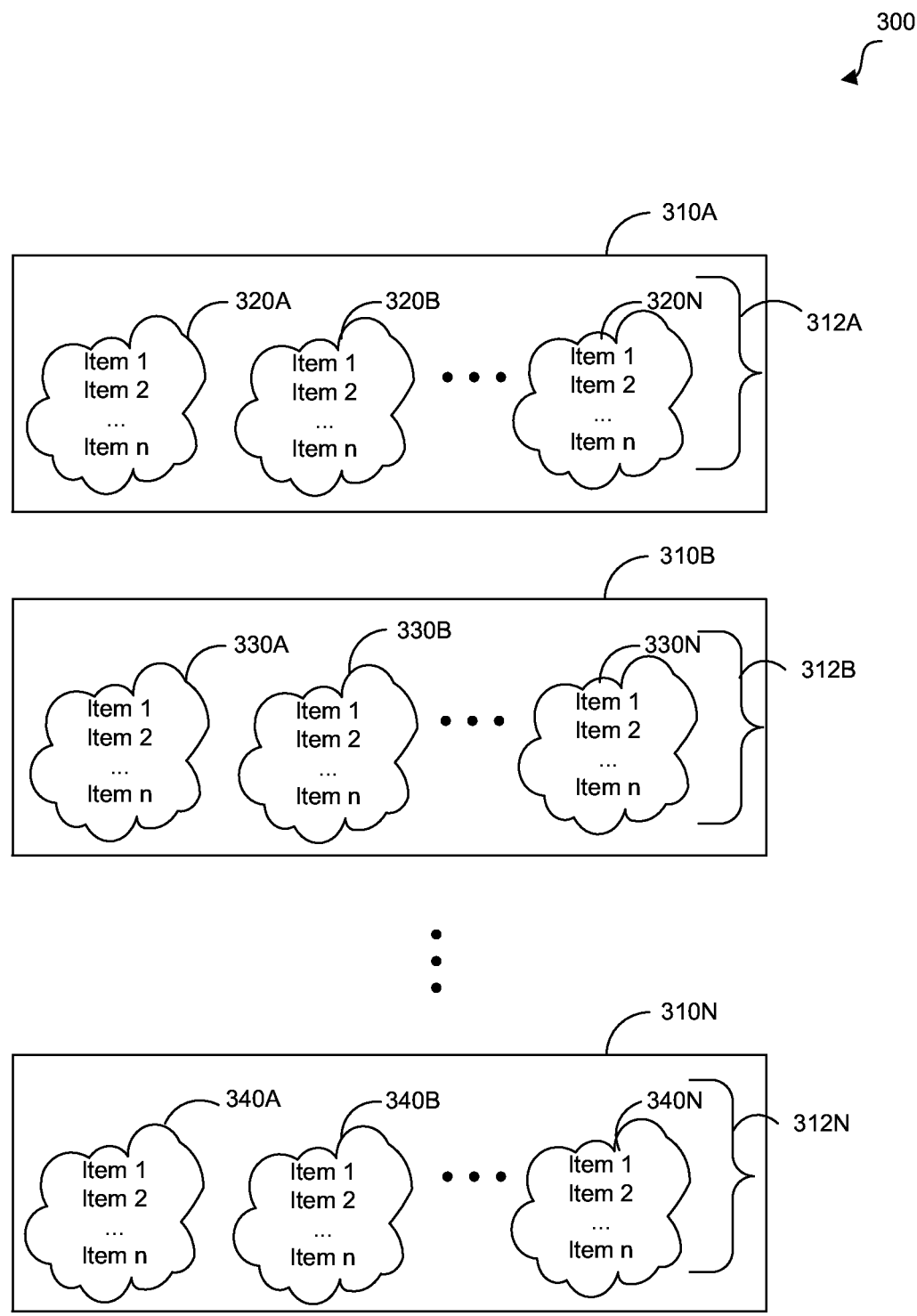

FIGS. 2 and 3 illustrate examples of working sets, according to one or more embodiments of the present disclosure. In FIG. 2, a graphical depiction of a plurality of working sets 212A-N associated with a plurality of front-end clusters 210A-N is shown. In embodiments, a working set 212A associated with a front-end cluster 210A is an aggregation of all unique cached items of the front-end cluster 210A, regardless of how many instances each data item is accessed, or stored, in that front-end cluster. For example, the front-end cluster 210A may include a set of ten data items {item 1, item 1, item 1, item 2, item 3, item 3, item 3, item 3, item 3, item 3}, but the working set 212A only includes the data items {item 1, item 2, item 3}. The plurality of working sets 212A-N are determined for the plurality of front-end clusters 210A-N based on a sampling of cache keys of all data items of the plurality of front-end clusters. A cache key is a unique identifier associated with a data item, where the identifier is generated using one or more hashing algorithms. According to an embodiment, a working set is determined for each front-end cluster by determining how many unique cached items, based on cache keys, are contained within each front-end cluster.

In FIG. 3, a graphical depiction of a plurality of working sets 312A-N associated with a plurality of regions 310A-N is shown. In embodiments, a working set 312A associated with a region 310A is an aggregation of all unique cached items of a plurality of front-end clusters 320A-N within the region 310A. For example, the region 310A may include two front-end clusters 320A, 320B, where the front-end cluster 320A includes a set of three cached items {item 1, item 1, item 1} and the front-end cluster 320B includes a set of two cached items {item 1, item 2, item 2}. The working set 312A of the region 310A, therefore, will only include two items {item 1, item 2}, regardless of how many instances each data item (i.e., item 1 and item 2) is accessed, or stored, in the front-end clusters 320A, 320B. The plurality of working sets 312A-N are determined for the plurality of regions 310A-N based on a sampling of cache keys of all data items of the plurality of regions. According to an embodiment, a working set is determined for each region by determining how many unique cache keys are contained in the one or more front-end clusters within the region.

It is noted that the working set associated with a front-end cluster and the working set associated with a region differ based on their respective sizes. For example, for a "regional" working set of a regional data center, the working set encompasses all unique cached items of the regional data center, stored across a plurality of front-end clusters within that regional data center. On the other hand, the working set of a front-end cluster within a regional data center is limited to those unique cached items stored within that front-end cluster. As will be discussed further in detail below, the respective sizes enable determination of different metrics (i.e., cluster stickiness index and region stickiness index), providing different perspectives of the overall networking system.

Cache Stickiness Index

Figure 4:
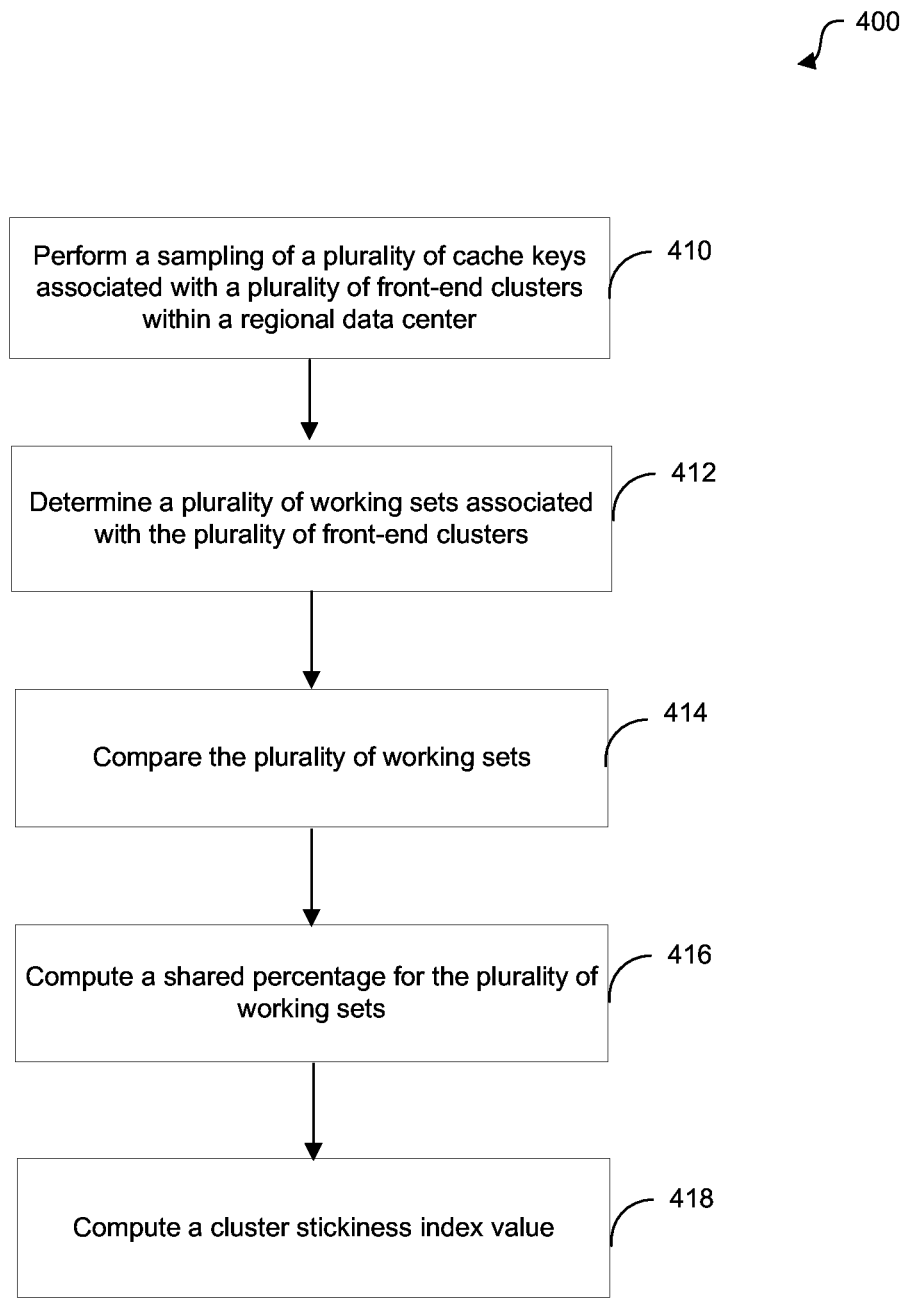
FIG. 4 is a flow diagram of an example process for generating a cluster stickiness index in accordance with one or more embodiments of the present disclosure.

FIG. 4 illustrates an example process 400 for generating a cluster stickiness index, according to an embodiment of the present disclosure. In embodiments, the cache stickiness module 130 of FIG. 1 may be utilized for executing the process 400. As illustrated in FIG. 4, the process 400 starts at step 410. At step 410, a sampling of a plurality of cache keys associated with all cached items of a plurality of front-end clusters within a regional data center is performed. As discussed above, a cache key is a system generated unique identifier assigned for each data item stored in a cache of a content delivery system (e.g., networking system). The cache key is generated using one or more hashing algorithms known in the art. At step 410, by sampling only a portion of all available cache keys, the cache stickiness module is able to analyze a subset of all unique cached items within the plurality of front-end clusters. Analyzing only the subset provides a representative assessment, as the total number of cached items may be too large. It is noted, however, one of ordinary skill in the art will appreciate that the number of cache keys sampled may be adjusted according to specific needs (e.g., to improve accuracy).

At step 412, a plurality of working sets is determined for the plurality of front-end clusters based on the sampled cache keys. In embodiments, a working set is determined for each front-end cluster of the plurality of front-end clusters within the regional data center. The working set is determined by identifying unique cached items contained in each particular front-end cluster, where the unique cached items are identified by the cache keys associated with the items. As a result, the working set determined includes a plurality of data items that are representative of all unique cached items of the front-end cluster. For example, the front-end cluster X includes the cached items {item 1, item 1, item 2, item 2, item 3} while the working set X determined for that cluster includes only the unique cached items {item 1, item 2, item 3}.

In embodiments, the working set determined at step 412 may be limited by the cache keys sampled at step 410. In one example, let cluster Y include cached items {item 2, item 2, item 4, item 4, item 5} and cluster Z include cached items {item 1, item 1, item 2, item 2, item 3}. When only the cache keys associated with item 1, item 2, and item 3 are sampled, the working set Y determined will only include {item 2} while the working set Z determined will include {item 1, item 2, item 3}. It is noted that while a smaller sampling may result in a reduction of a working set, according to some embodiments, such result does not necessarily affect the process 400 detrimentally. One of ordinary skill in the art will appreciate that the number of cache keys sampled may be adjusted according to specific needs associated with the analysis.

At step 414, the plurality of working sets determined are compared for matching data items, or matching cache keys. In particular, the cache keys, associated with the cached items of each working set, are compared across the plurality of front-end clusters for any duplication of the cache keys. For example, by comparing working set Y and working Z in the example above, one data item (i.e., item 2) is determined to be duplicate data. As will be discussed in further detail at steps 416-418, using such comparison, a cluster stickiness index value can be determined for each front-end cluster of the plurality of front-end clusters in the regional data center.

At step 416, a shared percentage for each of the plurality of working sets is computed. The term "shared percentage," as used herein, refers to the percentage of a particular working set that is shared, in terms of cache key(s), with one or more working sets. The shared percentage provides an indication whether there is duplication of data among the plurality of front-end clusters within the regional data center.

At step 418, a cluster stickiness index value (i.e., a stickiness value associated with a particular front-end cluster) is computed for each of the plurality of front-end clusters. In embodiments, the cluster stickiness index value is computed based on the shared percentage. In particular, the cluster stickiness index value depends on the number of cache keys shared (or duplicated) between the plurality of working sets associated with the plurality of front-end clusters. The higher the shared percentage, the more duplicate data item(s) exist between the plurality of front-end clusters. As such, a particular front-end cluster, having a high shared percentage (i.e., its data items are shared with many front-end clusters), likely has a lower stickiness value.

Steps 414-418 may be better understood with the help of some simplified mathematical expressions. First, a general overview of the steps 414-418 is provided by using two general mathematical expressions representative of a cluster stickiness index (i.e., "csi") and a cluster duplication index (i.e., "cdi"). The cluster duplication index includes values indicative of the sharing of data items across working sets associated with a plurality of front-end clusters within a region. The cluster stickiness index includes values indicative of how sticky is a particular front-end cluster within the region. The cluster stickiness value associated with the plurality of front-end clusters depends on a sharing of data items among the clusters. As such, the cluster duplication index helps determine the cluster stickiness index.

In discussing the general mathematical expressions, several assumptions are made for the sake of simplicity: (1) the working sets being analyzed are all equal in size; and (2) the cache key is either shared by all working sets in the region or it is not shared at all. Additionally, for the general mathematical expressions, let WS1, WS2, ... WSn represent a plurality of working sets associated with a plurality of n front-end clusters within a regional data center. For example, let WS1 represent working set 1 associated with front-end cluster 1 in a regional data center having three front-end clusters (i.e., n=3). In this example, WS1 includes unique cached items of the front-end cluster 1. Let $WS_{region}$ represent a working set associated with the regional data center in which the plurality of n front-end cluster belongs. For example, $WS_{region}$ is the working set including all unique cached items distributed across the three front-end clusters of the regional data center.

Accordingly, the steps 414-418 may generally be understood with the following general mathematical expressions:

$$cdi = (WS_1 + WS_2 + \ldots WS_n)/WSregion$$

$$csi = WSregion/(WS_1 + WS_2 + \ldots WS_n)$$

where cdi is the cluster duplication index and csi is the cluster stickiness index, and where n is the total number of front-end clusters within the region.

With the equations above, consider a scenario when a front-end cluster is 100% sticky. In such scenario, the value for both csi and cdi equals to 1. This is so because, when a front-end cluster is sticky, no cache key of that front-end cluster is shared cross the other front-end clusters belonging to the same region. As discussed above, it is assumed that a cache key is either shared by all working sets in the region or it is not shared at all. Since there is no sharing by one cluster, no sharing exists at all for the rest of the clusters under this analysis. As such, the unique cached item(s) of each working set remain unique and are accordingly counted in the WSregion. As such, $WS_{region}$ may be represented as a summation of all working sets in the region, where WSregion contains the unique cached items from all of the working sets. The scenario can be understood with the following calculations:

$$WSregion = (WS_1 + WS_2 + \ldots + WS_n) \text{ when there is no shared cache key,}$$

such that:

$$cdi = (WS_1 + WS_2 + \ldots WS_n)/WSregion$$
$$= (WS_1 + WS_2 + \ldots WS_n)/(WS_1 + WS_2 + \ldots WS_n)$$
$$cdi = 1$$

and such that:

$$csi = WSregion/(WS_1 + WS_2 + \ldots WS_n)$$
$$= (WS_1 = WS_2 + \ldots WS_n)/(WS_1 + WS_2 + \ldots WS_n)$$
$$csi = 1$$

where n is the total number of front-end clusters within the region.

On the other hand, consider a scenario when a front-end cluster is 0% sticky. In such scenario, the cache key is duplicated, or shared across all of the front-end clusters within the region. Using the same general mathematical expressions, the values for csi and cdi now differ. When there is duplication, or sharing, the unique cached item(s) of every working set are the same as those of the remaining working sets. The following results:

$$WSregion = WS_1 = WS_2 = \ldots WS_n \text{ when there is shared cache key (i.e., duplication),}$$

Such that:
csi = 1/n
cdi = n

Where n is the total number of front-end clusters within the region.

A more involved discussion of calculating the csi is possible by further analyzing the duplication of data items, or shared percentage associated with each working set. The higher the shared percentage, the more duplicate data item(s) exist between the plurality of working sets. Further, the higher the percentage, the less "sticky" is the front-end cluster storing that particular data item (having the unique cache key).

For the sake of simplicity, certain assumptions are made in the following discussion. First, the working sets in the discussion are all equal in size. For example, working set 1 associated with front-end cluster 1 has two unique cache keys, and working set 2 associated with front-end cluster 2 also has two unique cache keys. Second, a cache key is either (i) shared across all front-end clusters or (ii) not shared at all with any other front-end clusters (i.e. no duplication). Third, the value of the shared percentage is within the range [0-1], with "0" indicative of 0% sharing and "1" indicative of 100% sharing.

Let s represent the shared percentage. The shared percentage for three front-end clusters, for example, may be represented by the following diagram:

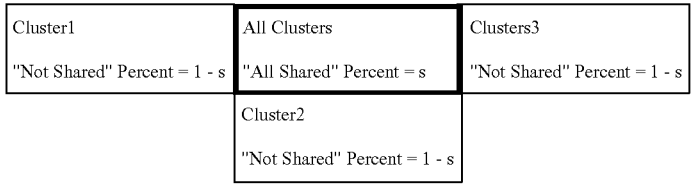

As can be seen from the above diagram, the csi calculation may be represented by the following simplified mathematical expressions:

$$WS_{region}=n*(1-s)+s=n+(1-n)s$$

where $WS_1=WS_2=\ldots=WS_n=1$
and, as discussed above, where $csi=WS_{region}/(WS_1+WS_2+\ldots+WS_n)$ $$csi = (n+(1-n)s)/(1+1+\ldots+1)$$
$$= (n+(1-n)s)/n$$
$$= 1+((1-n)/n)s$$

As a result:

$$csi=1+((1-n)/n)s$$

where n is the total number of front-end clusters within the region.
where when:
s=0, csi=1→best cluster stickiness index value
s=1, csi=1/n→worst cluster stickiness index value As can be seen above, when the shared percentage is 0 (i.e., no duplication of data among the front-end clusters), the csi value is 1. When csi=1, the best stickiness value possible occurs, indicating that a particular front-end cluster is highly sticky. When a front-end cluster is sticky, a particular data item requested is likely present in that cluster. A request routed to that cluster will likely result, for example, in a cache hit. Consider the other scenario, where the shared percentage is 1, the csi value is 1/n (e.g., 1/3 for three front-end clusters). When csi=1/n, the worst stickiness value possible occurs, indicating data duplication across all front-end clusters within the region. In this scenario, when a particular front-end cluster is less sticky, a user request for the data item, for example, is not likely to "stick" to that front-end cluster because another front-end cluster can readily serve that same data item. In such scenario, cache efficiency, for example, may be at its worst due to data duplication. However, disaster recovery, for example, may be at its best, as the data item may be readily available even if the particular front-end cluster is inaccessible.

A further analysis of the csi may be performed by looking at the change in shared percentage. Consider the derivative of the $cs_i$ function.

$$Dcsi=((1-n)/n)Ds$$

Where:

$$Ds=(n/(1-n))Dcsi$$

As can be seen above, the change in shared percentage is n/(n−1) of the change in the cluster stickiness index value, where the shared percentage change is in the opposite direction of the csi change. For example, assuming three front-end clusters within the region, where n=3, the change in shared percentage is 3/2 times the change in the csi value.

Figure 5:
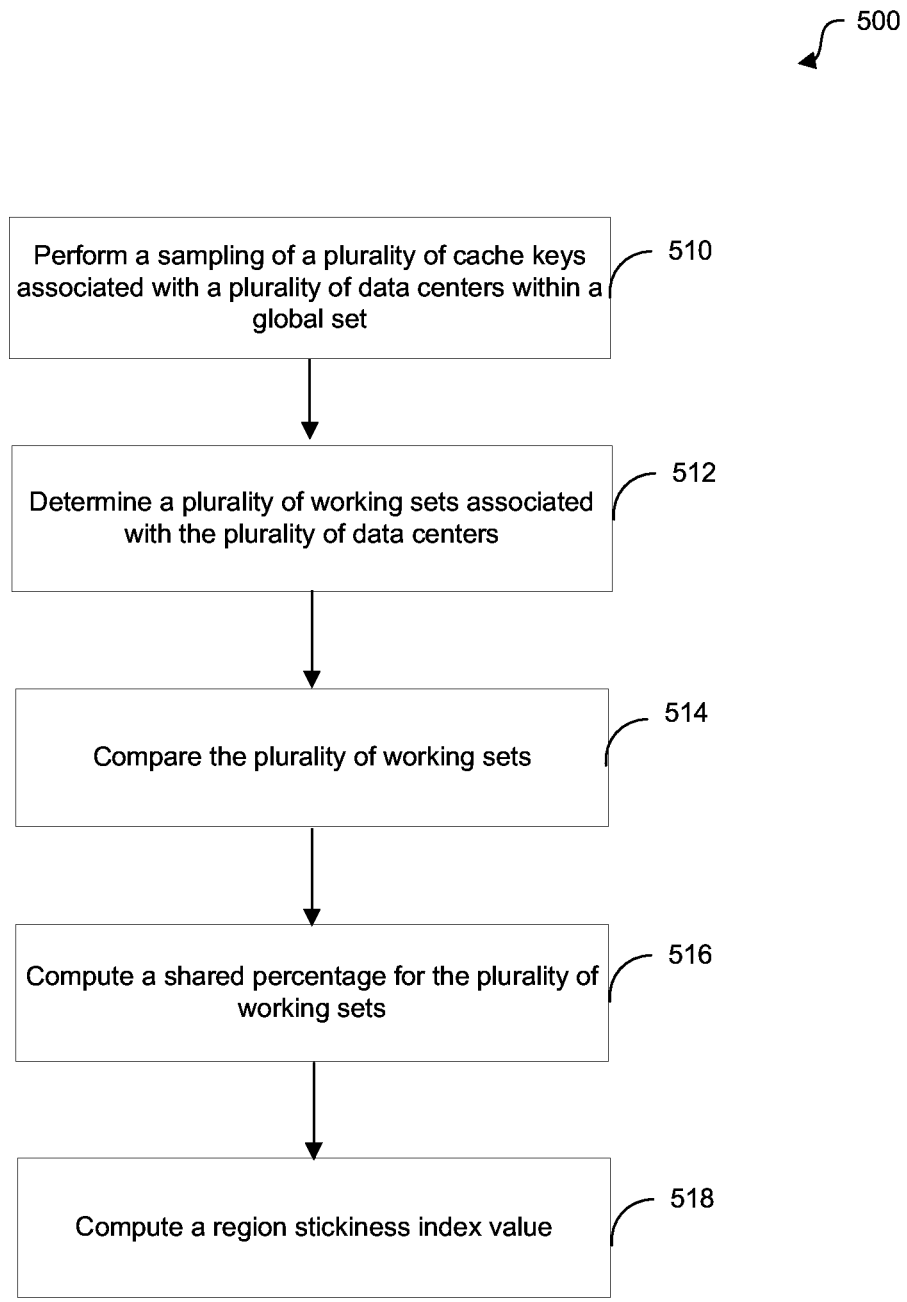
FIG. 5 is a flow diagram of an example process for generating a region stickiness index in accordance with one or more embodiments of the present disclosure.

FIG. 5 illustrates an example process 500 for generating a region stickiness index, according to an embodiment of the present disclosure. In embodiments, the cache stickiness module 130 of FIG. 1 may be utilized for executing the process 500. As discussed above, the region stickiness index is an index of stickiness values associated with a particular regional data center, as opposed to a particular front-end cluster. Referring to FIG. 5, the process 500 starts at step 510. At step 510, a sampling of a plurality of cache keys associated with all cached items of a plurality of regional data centers within a global set is performed. As discussed above, a cache key is a system generated unique identifier assigned for each data item stored in a cache of a content delivery system (e.g., networking system). The cache key is generated using one or more hashing algorithms known in the art. At step 510, by sampling only a portion of all available cache keys, the cache stickiness module is able to analyze a subset of all unique cached items within the plurality of regional data centers. Analyzing only the subset provides a representative assessment, as the total number of cached items may be too large. It is noted, however, one of ordinary skill in the art will appreciate that the number of cache keys sampled may be adjusted according to specific needs (e.g., to improve accuracy).

At step 512 a plurality of working sets is determined for the plurality of regional data centers based on the sampled cache keys. In embodiments, a working set is determined for each regional data center of the plurality of regional data centers within the global set. The working set is determined by identifying unique cached items contained in each particular regional data center, where the unique cached items are identified by the cache keys associated with the items. As a result, the working set determined includes a plurality of data items that are representative of all unique cached items of the regional data center. For example, the regional data center X includes the cached items {item 1, item 1, item 2, item 2, item 3} while the working set X determined for that regional data center includes only the unique cached items {item 1, item 2, item 3}.

In embodiments, the working set determined at step 512 may be limited by the cache keys sampled at step 510. In one example, let regional data center Y include three front-end clusters, where the cached items of those clusters include the items {item 2, item 2, item 4, item 4, item 5}, and let regional data center Z include three front-end clusters, where the cached items of those clusters include the items {item 1, item 1, item 2, item 2, item 3}. When only the cache keys associated with item 1, item 2, and item 3 are sampled, the working set Y determined will only include {item 2} while the working set Z determined will include {item 1, item 2, item 3}. It is noted that while a smaller sampling may result in a reduction of a working set, according to some embodiments, such result does not necessarily affect the process 500 detrimentally. One of ordinary skill in the art will appreciate that the number of cache keys sampled may be adjusted according to specific needs associated with the analysis.

At step 514, the plurality of working sets determined are compared for matching data items, or matching cache keys. In particular, the cache keys, associated with the cached items of each working set, are compared across the plurality of regional data centers for any duplication of the cache keys. For example, by comparing working set Y and working Z in the example above, one data item (i.e., item 2) is determined to be duplicate data. As will be discussed in further detail at steps 516-418, using such comparison, a region stickiness index value can be determined for each regional data center of the plurality of regional data centers in the global set.

At step 516, a shared percentage for each of the plurality of working sets is computed. The term "shared percentage," as used herein, refers to the percentage of a particular working set that is shared, in terms of cache key(s), with one or more working sets. The shared percentage provides an indication whether there is duplication of data among the plurality of regional data centers within the global set.

At step 518, a region stickiness index value (i.e., a stickiness value associated with a particular regional data center) is computed for each of the plurality of regional data centers. In embodiments, the region stickiness index value is computed based on the shared percentage. In particular, the region stickiness index value depends on the number of cache keys shared (or duplicated) between the plurality of working sets associated with the plurality of regional data centers. The higher the shared percentage, the more duplicate data item(s) exist between the plurality of regional data centers. As such, a particular regional data center, having a high shared percentage (i.e., its data items are shared with many front-end clusters), likely has a lower stickiness value.

Steps 514-518 may be better understood with the help of some simplified mathematical expressions. First, a general overview of the steps 514-518 is provided by using two general mathematical expressions representative of a region stickiness index (i.e., "rsi") and a region duplication index (i.e., "rdi"). The region duplication index includes values indicative of the sharing of data items across working sets associated with a plurality of regional data centers within a global set. The region stickiness index includes values indicative of how sticky is a particular regional data center within the global set. The region stickiness value associated with the plurality of regional data centers depends on a sharing of data items among the data centers. As such, the region duplication index helps determine the region stickiness index.

In discussing the general mathematical expressions, several assumptions are made for the sake of simplicity: (1) the working sets being analyzed are all equal in size; and (2) the cache key is either shared by all working sets in the global set or it is not shared at all. Further, for the general mathematical expressions, let WS1, WS2, ... WSn represent a plurality of working sets associated with a plurality of n regional data centers within a global set associated with a networking system. For example, let WS1 represent working set 1 associated with regional data center 1 in a global set having three regional data centers (i.e., n=3). In this example, WS1 includes unique cached items of the regional data center 1. Let WSglobal represent a working set associated with the global set of the networking system. For example, WSglobal is the working set including all unique cached items distributed across the three regional data centers of the global set utilized by the networking system to service user requests.

Accordingly, the steps 514-518 may generally be understood with the following general mathematical expressions:

$$rdi = (WS_1 + WS_2 + \ldots WS_n)/WS_{global}$$

$$rsi = WS_{global}/(WS_1 + WS_2 + \ldots WS_n)$$

where rdi is the region duplication index and rsi is the region stickiness index, and where n is the total number of regions within the global set.

With the equations above, consider a scenario when a regional data center is 100% sticky. In such scenario, the value for both rsi and rdi equals to 1. This is so because, when a regional data center is sticky, no cache key of that regional data center is shared cross the other regional data centers belonging to the same global set. As discussed above, it is assumed that a cache key is either shared by all working sets in the global set or it is not shared at all. Since there is no sharing by one regional data center, no sharing exists at all for the rest of the regional data centers under this analysis. As such, the unique cached item(s) of each working set remain unique and are accordingly counted in the WSglobal. As such, WSglobal may be represented as a summation of all working sets in the global set, where WSglobal contains the unique cached items from all of the working sets. The scenario can be understood with the following calculations:

$$WS_{global} = (WS_1 + WS_2 + \ldots + WS_n) \text{ when there is no shared cache key,}$$

such that:

$$rdi = (WS_1 + WS_2 + \ldots WS_n)/WS_{global}$$
$$= (WS_1 + WS_2 + \ldots WS_n)/(WS_1 + WS_2 + \ldots WS_n)$$
$$rdi = 1$$

and such that:

$$rsi = WS_{global}/(WS_1 + WS_2 + \ldots WS_n)$$
$$= (WS_1 + WS_2 + \ldots WS_n)/(WS_1 + WS_2 + \ldots WS_n)$$
$$rsi = 1$$

where n is the total number of regions within the global set.

On the other hand, consider a scenario when a regional data center is 0% sticky. In such scenario, the cache key is duplicated, or shared across all of the regional data centers within the global set. Using the same general mathematical expressions above, the values for rsi and rdi now differ. When there is duplication, or sharing, the unique cached item(s) of every working set associated with every regional data center are the same as those of the remaining working sets. The following results:

$$WS_{global}=WS_1=WS_1=\ldots WS_n \text{ when there is shared cache key (i.e., duplication),}$$

Such that:

rsi=1/n rdi=n where n is the total number of regions within the global set.

A more involved discussion of calculating the rsi is possible by further analyzing the duplication of data items, or shared percentage associated with each working set. The higher the shared percentage, the more duplicate data item(s) exist between the plurality of working sets. Further, the higher the percentage, the less "sticky" is the regional data center storing that particular data item (having the unique cache key).

To simplify the discussion, three assumptions, similar to those in the cluster stickiness index discussion, are made: (1) the working set sizes are all equal for all regional data centers; (2) sharing of a cache key is either 100% shared across all regions or 0% shared with any region (i.e. no duplication at all); (3) and the value of the shared percentage in the discussion is within the range [0-1], with "0" indicative of 0% sharing and "1" indicative of 100% sharing.

Let s represent the shared percentage. The shared percentage for three regions, for example, may be represented by the following diagram:

| Region1 | All Regions | Region3 |
|---|---|---|
| "Not Shared" Percent = 1 - s | "All Shared" Percent = s | "Not Shared" Percent = 1 - s |
| | Region2 | |
| | "Not Shared" Percent = 1 - s | |

As can be seen from the above diagram, the rsi calculation may be represented by the following simplified mathematical expressions:

$$WS_{global}=3*(1-s)+s=3-2s$$

where $WS_1=WS_2=\ldots WS_n=1$ and, as discussed above, where $rsi=WS_{global}/(WS_1+WS_2+\ldots WS_n)$ $$rsi = (3-2s)/(1+1+1)$$
$$= 1 - 2s/3$$

As a result:

$$rsi=1-2s/3$$

Where when:

s=0, rsi=1→best region stickiness index value s=1, rsi=1/n→worst region stickiness index value As can be seen above, in a scenario when the shared percentage is 0 (i.e., no duplication of data among the regional data centers), the rsi value is 1. When rsi=1, the best stickiness value possible occurs, indicating that a particular regional data center is highly sticky. When a particular regional data center is sticky, a particular data item requested is likely present in that regional data center. A request routed to that regional data center will likely result, for example, in a cache hit. Consider the other scenario, when the shared percentage is 1, the rsi value is 1/n (e.g., 1/3 for three regional data centers). When rsi=1/n, the worst stickiness value possible occurs, indicating data duplication across all regional data centers within the global set. In this scenario, when a particular regional data center is less sticky, a user request for the data item, for example, is not likely to "stick" to that regional data center because another regional data center can readily serve that same data item. In such scenario, data center utilization, for example, may be at its worst due to data duplication. However, disaster recovery, for example, may be at its best, as the data item may be readily available at another regional data center even if the particular regional data center is inaccessible.

A further analysis of the rsi may be performed by looking at the change in shared percentage. Consider the derivative of the rsi function.

$$Drsi=((1-n)/n)Ds$$

Where:

$$Ds=(n/(1-n))Drsi$$

As can be seen above, the change in shared percentage is n/(n−1) of the change in the region stickiness index value, where the shared percentage change is in the opposite direction of the rsi change. For example, assuming three regions within the global set, where n=3, the change in shared percentage is 3/2 times (or, 1.5×) the change in the rsi value. In other words, a small change of rsi value corresponds to a much higher reverse change for the s value.

Figure 6:
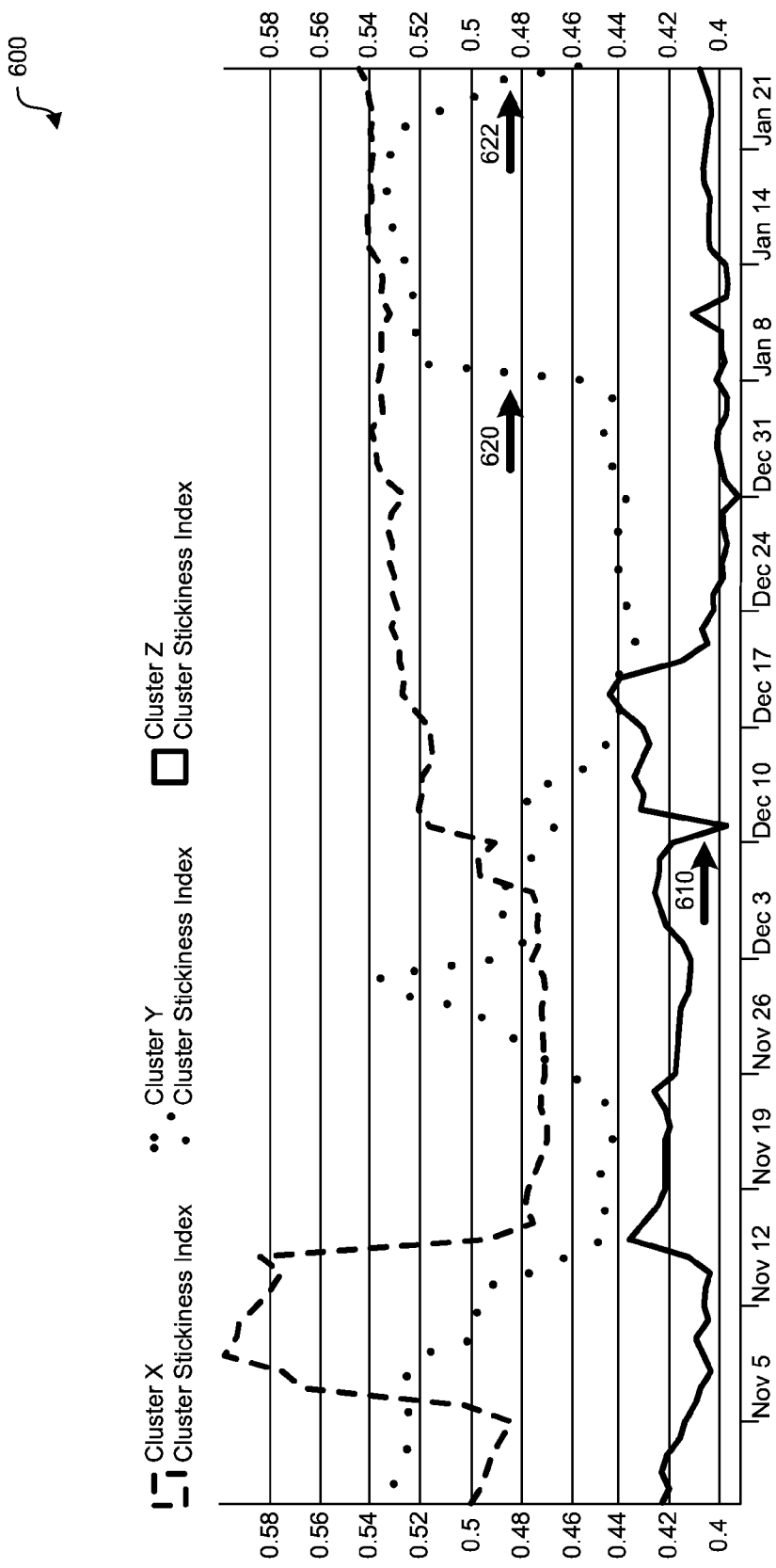
FIG. 6 is a graphical depiction of an example cluster stickiness index in accordance with one or more embodiments of the present disclosure.

FIG. 6 is a graphical depiction of an example trending chart 600 of a cluster stickiness index in accordance with one or more embodiments of the present disclosure. Referring to FIG. 6, sample stickiness values associated with a cluster stickiness index are mapped over a span of time in the trending chart 600. The cluster stickiness index contains stickiness values for each of the three front-end clusters (i.e., Cluster X, Cluster Y, Cluster Z), where the values are computed from November 5th to January 21. The trending chart 600 may help a developer, for example, in making a more intelligent decision on configuring access management operations. For example, by looking at a first point 610, the developer can see a significant stickiness value drop accompanied by a subsequent rapid increase on December 10th for Cluster Y. The value drop/rapid increase may provide a validation, for example, of some event that happened to Cluster Y on December 10th. In another example, assume Cluster Y was inaccessible (e.g., shut down) on January 8th, the developer can observe such change by looking at a second point 620, where the stickiness value increased. The increased stickiness value can be understood by the developer, as having one less front-end cluster would mean one less place to store a data item, resulting in a lower amount of duplicate data and of shared percentage. On the other hand, assume Cluster Y became accessible again by the end of January, the developer can observe such change by looking at a third point 622. The decrease in stickiness value, as shown at the third point 622, can make sense to the developer because the availability of Cluster Y would result in an additional place to store a data item, resulting in duplicate data and a higher shared percentage associated with the item stored/accessed between the front-end clusters.

Other decisions may also be better informed by looking at the trending chart 600. These decisions may carried out differently according to different needs of the networking system. For example, seeing that a certain front-end cluster is highly sticky (e.g., high cluster stickiness value), a traffic routing policy may be configured to route the same user request (i.e., user request for data already existing in the front-end cluster) to that front-end cluster every time, so as to improve cache hit ratio. Alternately, the same user request may be routed, for example, to a completely different front-end cluster in a completely different data center. Such routing decision may be carried out to help increase disaster recovery flexibility, despite reducing the stickiness value for (i) the front-end cluster and (ii) the data center in which the front-end cluster belongs.

Social Networking System Architecture

As mentioned above, embodiments of the present disclosure may be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, manufacturers. The social networking system allows its users to interact with each other as well as with other objects maintained by the social networking system. In some embodiments, the social networking system allows users to interact with third-party websites and financial account providers.

Based on stored data about users, objects and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 7:
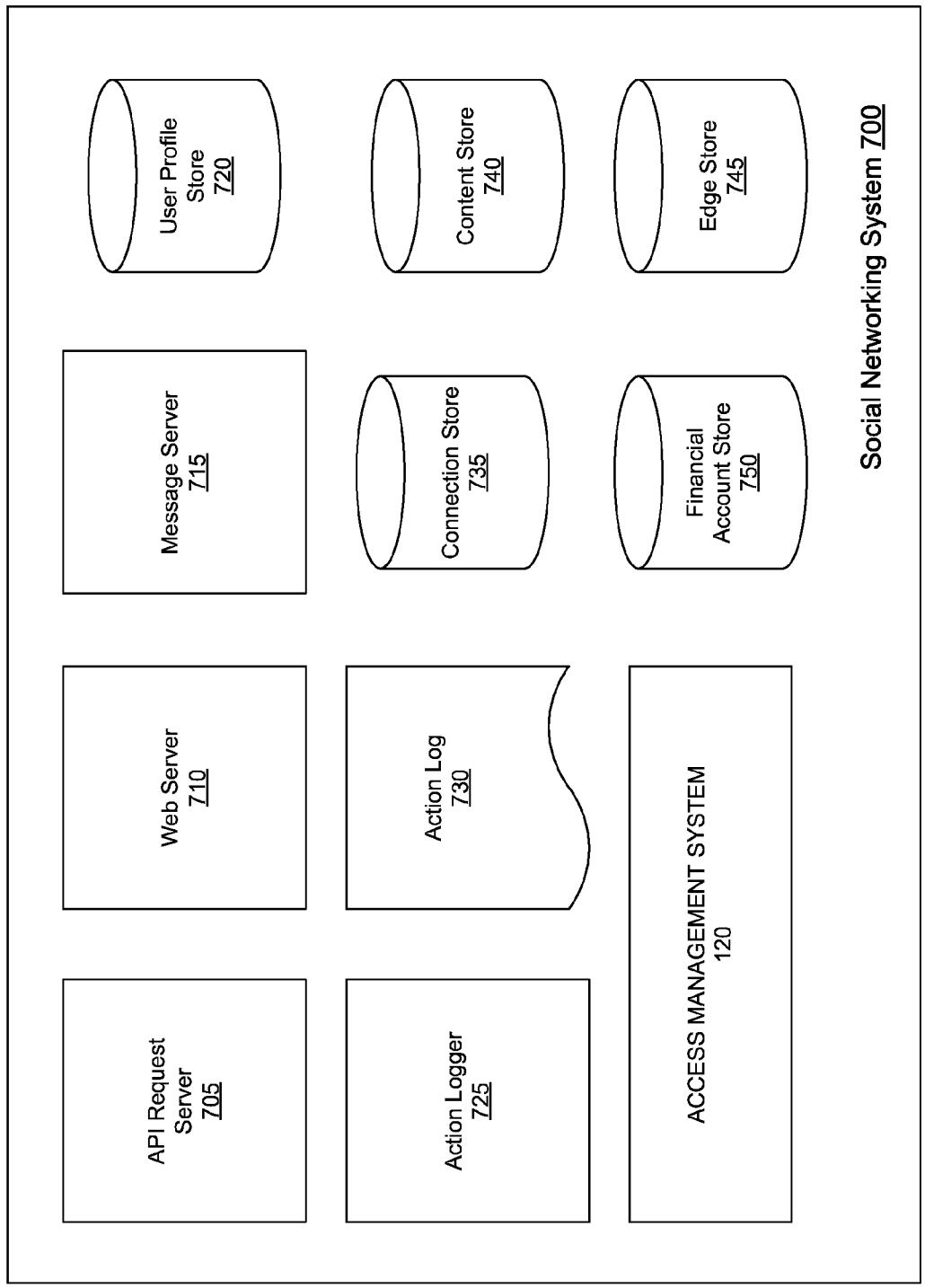
FIG. 7 is a block diagram of an example system architecture of a social networking system with which some embodiments of the present disclosure may be utilized.

FIG. 7 is a block diagram of an example system architecture of a social networking system 700 with which some embodiments of the present disclosure may be utilized. In some embodiments, the social networking system 700 may utilize the cache stickiness module 130 of FIG. 1 for generating stickiness values. In one embodiment, the social networking system 700 may route user requests for accessing a data item from the plurality of caches 120 based on the stickiness values generated. For example, the social networking system, via its access management system, may choose to route a user request to a "highly sticky" front-end cluster or a "highly sticky" regional data center where the data item is "hot" to improve cache hit ratios. In another embodiment, the social networking system 700 may perform deduplication on the plurality of caches based on the stickiness values generated. For example, the social networking system may decide to perform deduplication on a front-end cluster with a very low stickiness value, indicating data items of that cluster are shared with many other front-end clusters.

The social networking system 700 illustrated by FIG. 7 includes API request server 705, web server 710, message server 715, user profile store 720, action logger 725, action log 730, connection store 735, content store 740, edge store 745, and financial account store 750. Information in the user profile store 720, content store 740, connection store 735, edge store 745, financial account store 750, and/or action log 730 may be stored in the plurality of caches 122. Data stored in the plurality of caches may be accessed, analyzed, and/or processed by the cache stickiness module 130. In other embodiments, the social networking system 700 may include additional, fewer, or different modules for various applications. Conventional components such as network interfaces, security mechanisms, load balancers, failover servers, management and network operations consoles, and the like are not shown so as to not obscure the details of the system architecture.

The API request server 705 allows other systems, user devices, or tools to access information from the social networking system 700 by calling APIs. The information provided by the social network may include user profile information or the connection information of users as determined by their individual privacy settings. For example, a system, user device, or tools interested in accessing data connections within a social networking system may send an API request to the social networking system 700 via a network. The API request is received at the social networking system 700 by the API request server 705. The API request server 705 processes the request by submitting the access request to an access management system 120 where access is determined and any data communicated back to the requesting system, user device, or tools via a network.

The web server 710 links the social networking system 700 via a network to one or more client devices; the web server serves web pages, as well as other web-related content, such as Java, Flash, XML, and so forth. The web server 710 may communicate with the message server 715 that provides the functionality of receiving and routing messages between the social networking system 700 and the client devices. The messages processed by the message server 715 can be instant messages, queued messages (e.g., email), text and SMS (short message service) messages, or any other suitable messaging technique. In some embodiments, a message sent by a user to another can be viewed by other users of the social networking system 700, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 700 is associated with a user profile, which is stored in the user profile store 720. A user profile includes declarative information about the user that was explicitly shared by the user, and may also include profile information inferred by the social networking system 700. In one embodiment, a user profile includes multiple data fields, each data field describing one or more attributes of the corresponding user of the social networking system 700. The user profile information stored in the user profile store 720 describes the users of the social networking system 700, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 700 displayed in an image. A user profile in the user profile store 720 may also maintain references to actions by the corresponding user performed on content items in the content store 740 and stored in the edge store 745.

A user profile may be associated with one or more financial accounts, allowing the user profile to include data retrieved from or derived from a financial account. A user may specify one or more privacy settings, which are stored in the user profile, that limit information from a financial account that the social networking system 700 is permitted to access. For example, a privacy setting limits the social networking system 700 to accessing the transaction history of the financial account and not the current account balance. As another example, a privacy setting limits the social networking system 700 to a subset of the transaction history of the financial account, allowing the social networking system 700 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 700. In one embodiment, information from the financial account is stored in the user profile store 720. In other embodiments, it may be stored in the financial account store 750.

The action logger 725 receives communications about user actions on and/or off the social networking system 700, populating the action log 730 with information about user actions. Such actions may include, for example, adding a connection to another user, sending a message to another user, uploading an image, reading a message from another user, viewing content associated with another user, attending an event posted by another user, among others. In some embodiments, the action logger 725 receives, subject to one or more privacy settings, transaction information from a financial account associated with a user and identifies user actions from the transaction information. For example, the action logger 725 retrieves vendor identifiers from the financial account's transaction history and identifies an object, such as a page, in the social networking system 700 associated with the vendor identifier. This allows the action logger 725 to identify a user's purchases of products or services that are associated with a page, or another object, in the content store 740. In addition, a number of actions described in connection with other objects are directed at particular users, so these actions are associated with those users as well. These actions are stored in the action log 730.

The action log 730 may be used by the social networking system 700 to track user actions on the social networking system 700, as well as external website that communicate information to the social networking system 700. Users may interact with various objects on the social networking system 700, including commenting on posts, sharing links, and checking-in to physical locations via a mobile device, accessing content items in a sequence or other interactions. Information describing these actions is stored in the action log 730. Additional examples of interactions with objects on the social networking system 700 included in the action log 730 include commenting on a photo album, communications between users, becoming a fan of a musician, adding an event to a calendar, joining a groups, becoming a fan of a brand page, creating an event, authorizing an application, using an application and engaging in a transaction. Additionally, the action log 730 records a user's interactions with advertisements on the social networking system 700, as well as other applications operating on social networking system 700. In some embodiments, data from the action log 730 is used to infer interests or preferences of the user, augmenting the interests included in the user profile and allowing a more complete understanding of user preferences.

The action log 730 may also store user actions taken on external websites and/or determined from a financial account associated with the user. For example, an e-commerce website that primarily sells sporting equipment at bargain prices may recognize a user of the social networking system 700 through social plug-ins that enable the e-commerce website to identify the user of the social networking system 700. Because users of the social networking system 700 are uniquely identifiable, e-commerce websites, such as this sporting equipment retailer, may use the information about these users as they visit their websites. The action log 730 records data about these users, including webpage viewing histories, advertisements that were engaged, purchases made, and other patterns from shopping and buying. Actions identified by the action logger 725 from the transaction history of a financial account associated with the user allow the action log 730 to record further information about additional types of user actions.

The content store 740 stores content items associated with a user profile, such as images, videos or audio files. Content items from the content store 740 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 700. Examples of social networking content items include suggested connections or suggestions to perform other actions, media provided to, or maintained by, the social networking system 700 (e.g., pictures or videos), status messages or links posted by users to the social networking system, events, groups, pages (e.g., representing an organization or commercial entity), and any other content provided by, or accessible via, the social networking system.

The content store 740 also includes one or more pages associated with entities having user profiles in the user profile store 720. An entity is a non-individual user of the social networking system 700, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 740, allowing social networking system users to more easily interact with the vendor via the social networking system 700. A vendor identifier is associated with a vendor's page, allowing the social networking system 700 to identify the vendor and/or to retrieve additional information about the vendor from the user profile store 720, the action log 730, or from any other suitable source using the vendor identifier. In some embodiments, the content store 740 may also store one or more targeting criteria associated with stored objects and identifying one or more characteristics of a user to which the object is eligible to be presented.

In one embodiment, the edge store 745 stores the information describing connections between users and other objects on the social networking system 700 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 700, such as expressing interest in a page on the social networking system, sharing a link with other users of the social networking system, and commenting on posts made by other users of the social networking system. The edge store 745 stores edge objects that include information about the edge, such as affinity scores for objects, interests, and other users. Affinity scores may be computed by the social networking system 700 over time to approximate a user's affinity for an object, interest, and other users in the social networking system 700 based on the actions performed by the user. Multiple interactions between a user and a specific object may be stored in one edge object in the edge store 745, in one embodiment. In some embodiments, connections between users may be stored in user profile store 720, or the user profile store 720 may access the edge store 745 to determine connections between users.

Figure 8:
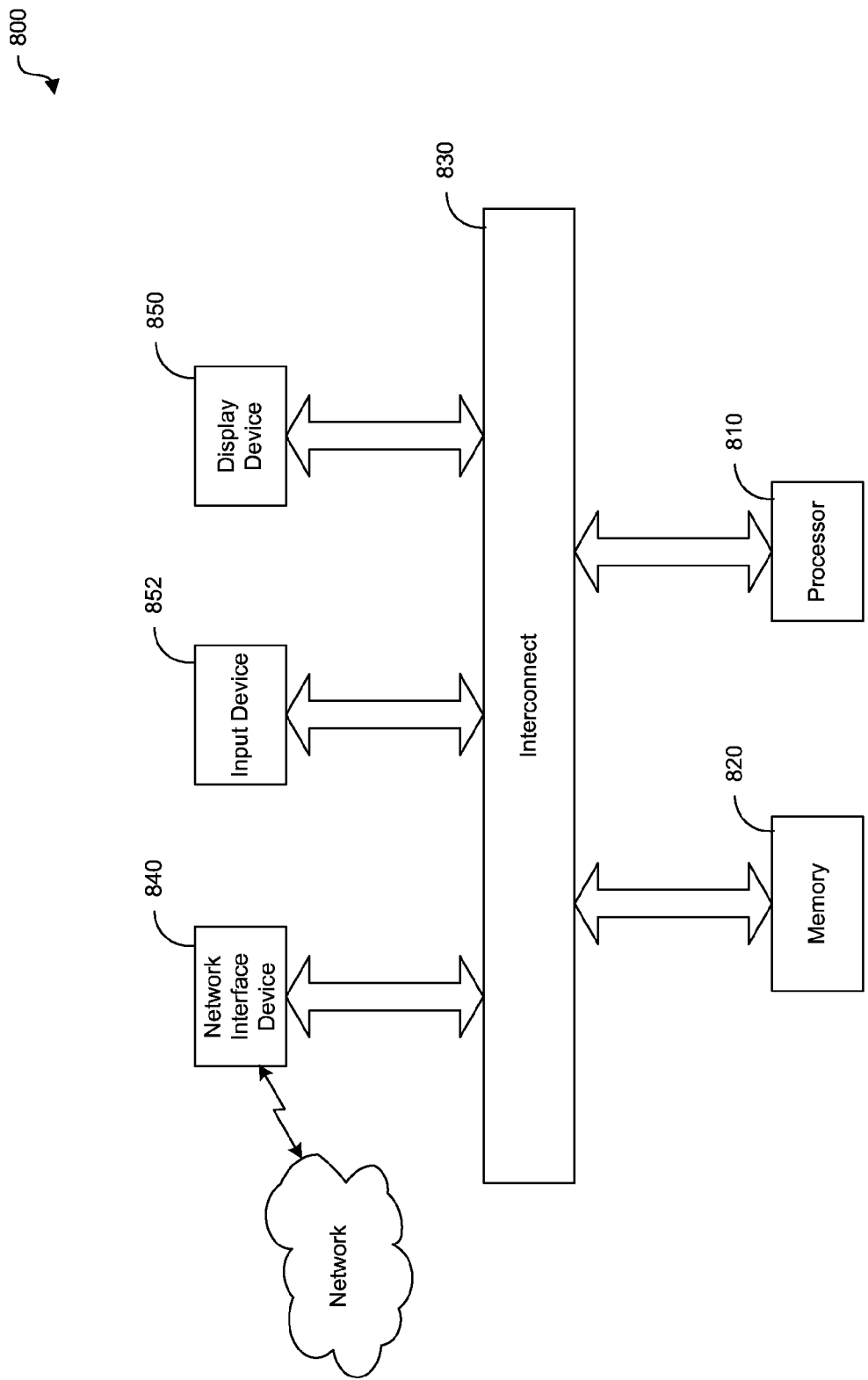
FIG. 8 is a block diagram of an example architecture for a system that may be utilized to implement the techniques described herein.

FIG. 8 is a block diagram of an example architecture for a system 800 that may be utilized to implement the techniques described herein. The system 800 may reside, for example, in the cache stickiness module. In FIG. 8, the system 800 includes one or more processors 810 and memory 820 connected via an interconnect 830. The interconnect 830 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire."

The processor(s) 810 may include central processing units (CPUs) that can execute software or firmware stored in memory 820. The processor(s) 810 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 820 represents any form of memory, such as random access memory (RAM), read-only memory (ROM), flash memory, or a combination of such devices. In use, the memory 820 can contain, among other things, a set of machine instructions which, when executed by processor 810, causes the processor 810 to perform operations to implement embodiments of the present invention.

Also connected to the processor(s) 810 through the interconnect 830 is a network interface device 840. The network interface device 840 provides the system 800 with the ability to communicate with remote devices, and may be, for example, an Ethernet adapter or Fiber Channel adapter.

The system 800 may also include one or more optional input devices 852 and/or optional display devices 850. Input devices 852 may include a keyboard, a mouse or other pointing device. The display device 850 may include a cathode ray tube (CRT), liquid crystal display (LCD), or some other applicable known or convenient display device.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference in their entireties. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method, comprising:
   determining a plurality of working sets, each associated with one or more cache devices of a networking system;
   generating an index based on the plurality of working sets as a function of a number of shared cache keys across the plurality of working sets; and
   storing the index in a database of the networking system for assisting content delivery.

2. A method according to claim 1, wherein generating the index based on the plurality of working sets includes generating a cluster stickiness index, wherein generating the cluster stickiness index comprises:
   determining a shared percentage for each working set of the plurality of working sets, the shared percentage being a percent of each working set that contains a cache key shared with remaining working sets from the plurality of working sets; and
   computing a cluster index value for each working set based on the shared percentage.

3. A method according to claim 2, wherein each working set corresponds to a front-end cluster of the networking system, wherein the front-end cluster is implemented by the one or more cache devices, such that each working set contains an aggregation of unique cached items of the one or more cache devices.

4. A method according to claim 3, wherein determining the plurality of working sets includes:
   for each working set,
      identifying the aggregation of unique cached items based on individual cache keys of a plurality of cached items of the one or more caches devices of each front-end cluster.

5. A method according to claim 1, wherein generating the index based on the plurality of working sets includes generating a region stickiness index, wherein generating the region stickiness index comprises:
   determining a shared percentage for each working set of the plurality of working sets, the shared percentage being a percent of each working set that contains a cache key shared with remaining working sets from the plurality of working sets; and
   computing a region index value for each working set based on the shared percentage.

6. A method according to claim 5, wherein each working set corresponds to a data center of the networking system, wherein the data center is implemented by the one or more cache devices, such that each working set contains an aggregation of unique cached items of the one or more cache devices.

7. A method, comprising:
   identifying, by a computing device, a plurality of working sets containing unique cached items of a networking system;
   comparing, by the computing device, the plurality of working sets to identify one or more shared cache keys across the plurality of working sets;
   for each working set, determining, by a computing device, a shared percentage based on the one or more shared cache keys, wherein the one or more shared cache keys correspond to the unique cached items; and
   generating, by a computing device, an index based on the shared percentage.

8. A method according to claim 7, wherein identifying the plurality of working sets includes sampling of a plurality of cache keys corresponding to cached items of the networking system.

9. A method according to claim 7, wherein generating the index includes generating a cluster stickiness index, the cluster stickiness index including stickiness values for a plurality of front-end clusters within a data center associated with the networking system.

10. A method according to claim 7, wherein generating the index includes generating a region stickiness index, the region stickiness index including stickiness values for a plurality of regions within a global set associated with the networking system.

11. A system, comprising:
   means for determining a plurality of working sets, each associated with one or more cache devices of a networking system;
   means for generating an index based on the plurality of working sets as a function of a number of shared cache keys across the plurality of working sets; and
   means for storing the index in a database of the networking system for content delivery.

12. A system according to claim 11, wherein each working set corresponds to a front-end cluster within a data center associated with the networking system, wherein the front-end cluster is implemented by the one or more cache devices, such that each working set contains an aggregation of unique cached data items of the one or more cache devices.

13. A system according to claim 12, wherein means for determining the plurality of working sets includes:
   means for identifying the aggregation of unique cached data items based on individual cache keys of a plurality of cached data items of the one or more cache devices of the front-end cluster.

14. A system according to claim 13, wherein means for generating the index includes:
   means for comparing the plurality of working sets to identify one or more of the shared cache keys across the plurality of working sets;
   means for generating a shared percentage for each working set based on a result of the comparing; and
   means for generating an index value for each working set based on the shared percentage.

15. A system according to claim 14, wherein the index value for each working set corresponds to the front-end cluster within the data center.

16. A system according to claim 14, wherein the index value for each working set corresponds to the data center within the global set.

17. A system according to claim 11, wherein each working set corresponds to a data center within a global set associated with the networking system, wherein each data center is implemented by the one or more cache devices, such that each working set contains an aggregation of unique cached data items of the one or more cache devices.

18. A system according to claim 17, wherein means for determining the plurality of working sets includes:
   means for identifying the aggregation of unique cached data items based on individual cache keys of a plurality of cached data items of the one or more cache devices of each data center.

19. A system according to claim 17, wherein means for generating the index includes:
   means for comparing the plurality of working sets to identify one or more of the shared cache keys across the plurality of working sets;
   means for generating a shared percentage for each working set based on a result of the comparing; and
   means for generating an index value for each working set based on the shared percentage.

20. A system according to claim 11, further comprising means for routing a user request for accessing a data item from the one or more cache devices associated with the plurality of working sets based on the index.

* * * * *